US012123584B2

(12) United States Patent
Colquhoun

(10) Patent No.: US 12,123,584 B2
(45) Date of Patent: Oct. 22, 2024

(54) TOY FIGURINE FOR DISPLAYING AN ANIMATED LIGHT PATTERN

(71) Applicant: Spin Master Ltd., Toronto (CA)

(72) Inventor: Robert Christian Colquhoun, Los Angeles, CA (US)

(73) Assignee: Spin Master Ltd., Toronto (CA)

( * ) Notice: Subject to any disclaimer, the term of this patent is extended or adjusted under 35 U.S.C. 154(b) by 206 days.

(21) Appl. No.: 17/814,590

(22) Filed: Jul. 25, 2022

(65) Prior Publication Data

US 2023/0204188 A1 Jun. 29, 2023

Related U.S. Application Data

(60) Provisional application No. 63/294,663, filed on Dec. 29, 2021.

(51) Int. Cl.
*A63H 33/00* (2006.01)
*A63H 3/00* (2006.01)
*A63H 33/26* (2006.01)
*F21V 3/04* (2018.01)

(52) U.S. Cl.
CPC ............... *F21V 3/04* (2013.01); *A63H 3/006* (2013.01)

(58) Field of Classification Search
CPC ......... A63H 3/006; A63H 33/22; A63H 33/26
See application file for complete search history.

(56) References Cited

U.S. PATENT DOCUMENTS 4,942,502 A 7/1990 Ohashi
5,310,377 A 5/1994 Joja
6,644,834 B2 11/2003 Christen
7,766,721 B2 8/2010 Ma
9,114,326 B2 8/2015 Johnson et al.
9,180,380 B2 11/2015 Cannon
9,573,069 B2 2/2017 Cannon
(Continued)

FOREIGN PATENT DOCUMENTS

CN 2841105 Y 6/2005
CN 203663459 U 1/2014
TW M484665 U 11/2013

OTHER PUBLICATIONS

CN2841105Y, English Machine Translation (Google).
TWM484665U, English Machine Translation (Google).
CN203663459U, English Machine Translation (Google).

*Primary Examiner* — John A Ricci
(74) *Attorney, Agent, or Firm* — Aird & McBurney LP

(57) ABSTRACT

In an aspect, a toy figurine for displaying an animated light pattern includes a main body, a plurality of light-emitting elements inside, and a controller. The light-emitting elements, when unilluminated, are invisible to a user outside the main body, and, when illuminated, are invisible to the user but emit light that is visible through a window of the main body. The controller is programmed to: a) illuminate a first light-emitting element at a first element illumination rate so as to emit first light through the window, b) illuminate a second light-emitting element at a second element illumination rate so as to emit through the light-diffusive window, second light which overlaps with the first light, and c) after step b) has begun, deilluminate the first light-emitting element at a first selected deillumination rate, so as to generate an appearance of light that travels along the window.

6 Claims, 9 Drawing Sheets

(56) References Cited

U.S. PATENT DOCUMENTS

| | | | | |
|---|---|---|---|---|
| 10,398,992 | B2 * | 9/2019 | Kerner | A63H 33/22 |
| 10,458,609 | B2 | 10/2019 | Wang | |
| 11,351,471 | B2 * | 6/2022 | Asperas | A63H 9/00 |
| 2013/0196569 | A1 | 8/2013 | Cannon | |
| 2015/0072589 | A1 | 3/2015 | Chan et al. | |

* cited by examiner

TOY FIGURINE FOR DISPLAYING AN ANIMATED LIGHT PATTERN

CROSS-REFERENCE TO RELATED APPLICATIONS

The present application claims the benefit of U.S. Provisional Application No. 63/294,663 filed Dec. 29, 2021, the contents of which are incorporated herein in their entireties.

FIELD OF THE INVENTION

The present invention relates generally to toys that can displayed patterns of light, and more specifically to a toy figurine for displaying an animated light pattern.

BACKGROUND

It is therefore an object of the invention to provide a novel toy figurine for displaying an animated light pattern.

SUMMARY OF THE DISCLOSURE

According to an aspect, there is provided a toy figurine for displaying an animated light pattern. The toy figurine includes a main body, a plurality of light-emitting elements, at least one opaque covering, and a controller. The main body includes an inner surface that defines an interior cavity and an outer surface, and includes at least one main body light-diffusive region that is composed of a light-diffusive material. The plurality of light-emitting elements that are in the interior cavity and are spaced apart from one another. The light-emitting elements, when unilluminated are invisible to a user outside the main body, and the light-emitting elements, when illuminated, are invisible to the user outside the main body but emit light that is visible to the user outside the main body. The at least one opaque covering is positioned within the main body to overlap a portion of the at least one light-diffusive region. The portion of the at least one light-diffusive region that is not overlapped by the at least one opaque covers defining a light-diffusive window through which light from the plurality of light-emitting elements is visible to a user outside the main body. The controller is programmed to:

a) illuminate a first one of the light-emitting elements at a first element illumination rate so as to emit first element light through the light-diffusive window,
b) illuminate a second one of the light-emitting elements at a second element illumination rate so as to emit through the light-diffusive window, second element light which overlaps partly with the first element light,
c) after step b) has begun, deilluminate the first one of the light-emitting elements at a first selected deillumination rate, so as to generate an appearance of light that travels along the light-diffusive window of the main body light-diffusive region.

BRIEF DESCRIPTION OF THE DRAWINGS

Embodiments will now be described, by way of example only, with reference to the attached Figures.

DETAILED DESCRIPTION OF THE EMBODIMENTS

Figure 1A:
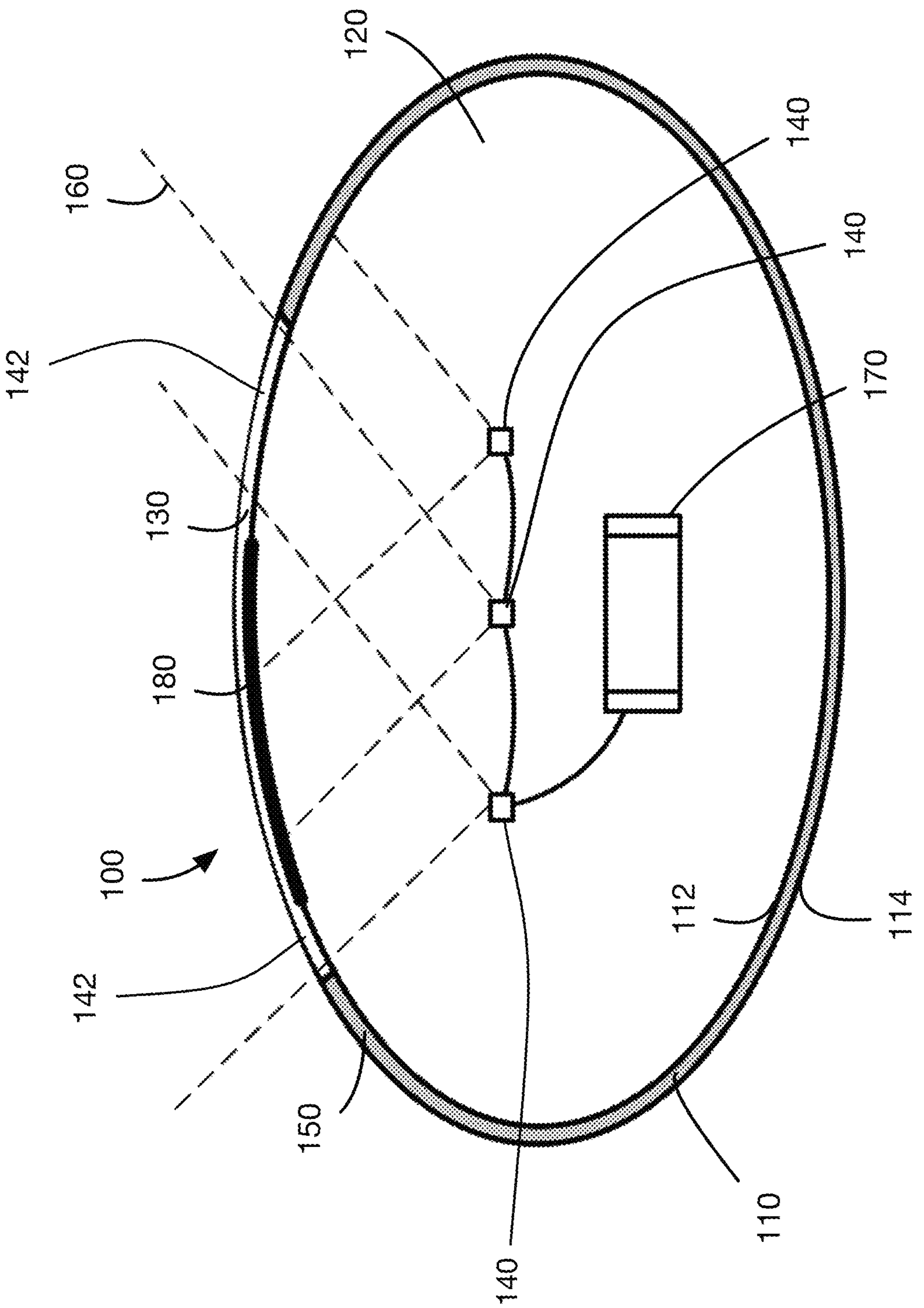
FIG. 1A shows an embodiment of the toy figurine having a generally elliptical main body and an integral opaque covering.

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The indefinite article "a" is not intended to be limited to mean "one" of an element. It is intended to mean "one or more" of an element, where applicable, (i.e. unless in the context it would be obvious that only one of the element would be suitable).

Any reference to upper, lower, top, bottom or the like are intended to refer to an orientation of a particular element during use of the claimed subject matter and not necessarily to its orientation during shipping or manufacture. The upper surface of an element, for example, can still be considered its upper surface even when the element is lying on its side.

Disclosed herein is a toy figurine for displaying an animated light pattern. The toy figurine is generally formed to include a main body with a light-diffusive regions, a plurality of light emitting elements, at least one opaque covering and a controller. The light diffusion region is generally at least partially opaque to allow the light emitting elements (and any associate components) within the toy figurine to remain hidden or obscured from direct view, while at the same time.

Figure 1B:
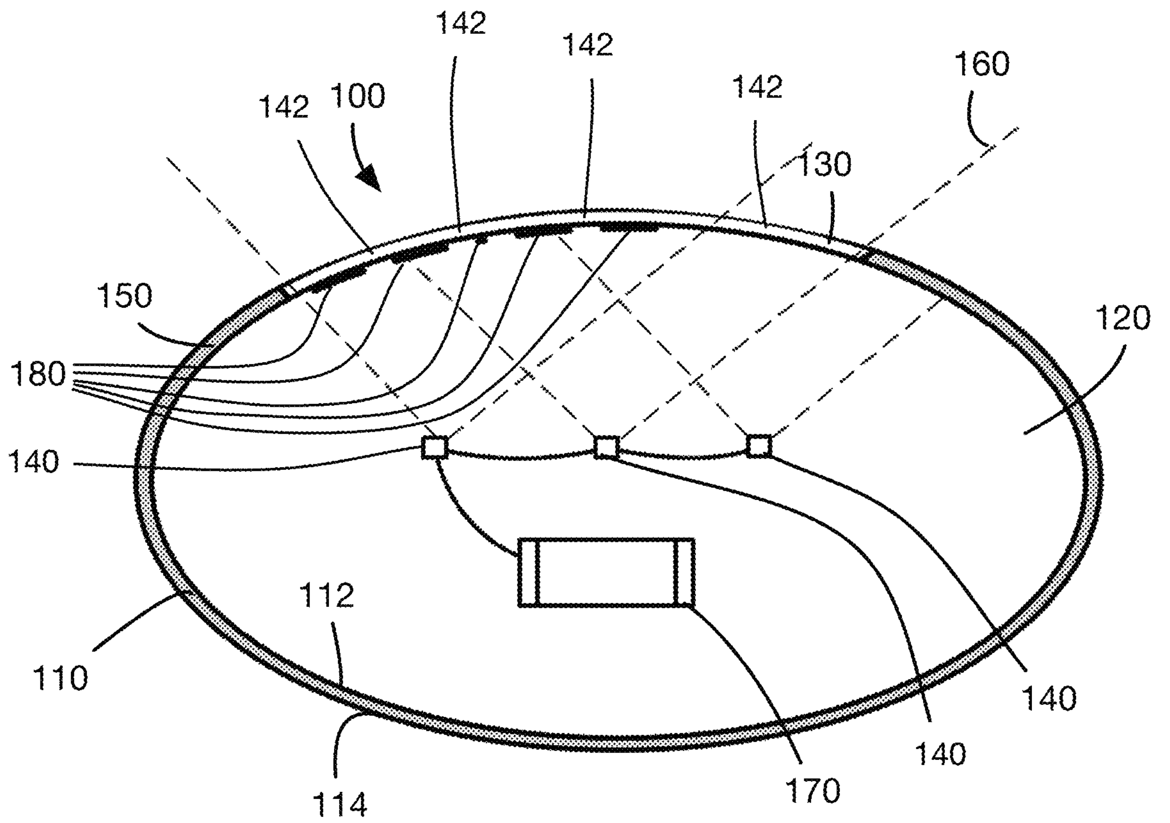
FIG. 1B shows an embodiment of the toy figurine having a generally elliptical main body and an opaque covering on an inner surface of the main body.

An exemplary embodiment of the structure of the toy figurine is provided in FIGS. 1A and 1B. The main body 110 of the toy figurine 100 includes an inner surface 112 that defines an interior cavity 120 and an outer surface 114 that is visible from the exterior of the main body 110. The main body 110 includes at least one main body light-diffusive region 130 that is composed of or comprises a light-diffusive material.

The light-diffusive region 130 is generally at least partially opaque to allow light from a plurality of light emitting elements 140 (and any associated components) in the interior cavity 120 of the toy figurine 100 to remain hidden or obscured from direct view, while at the same time, the light-diffusive region 130 is semi-translucent to allow some light from within the main body 110 to be visible from an exterior thereof, through the light-diffusive region 130. The combined semi-translucency and opaqueness of the light-diffusive region 130 creates a perception that light emitted by the plurality of light-emitting elements 140 is emerging from a core of the toy figurine 100.

In the embodiments presented in FIGS. 1A and 1B, the main body 110 is a generally elliptical, thin, main body which includes an inner surface 112 and which defines an interior cavity 120 and the outer surface 114. In this embodiment the inner surface is generally elliptical and the interior cavity is generally elliptical, however, any other suitable shape is contemplated. The main body 110 of the toy figurine may include of at least one region that is light-diffusive and at least one region that is opaque and does not allow light transmission.

In an embodiment, the light-diffusive region of the main body comprises a rigid, light-diffusive material that is integrally formed as part of the main body, and the opaque region is formed of a rigid, opaque material that is also integrally formed within the main body. As presented in FIGS. 1A-1B, the generally elliptical main body 110 includes an integral, main body light-diffusive region 130 composed of a light-diffusive material and an integral, main body opaque region 150 composed of an opaque material through which light cannot travel. The rigid materials of the opaque and light-diffusive regions 150, 130 may be opaque and light-diffusive plastics, where the opaque plastic is sufficiently opaque so as to prevents the passthrough of light In an alternative embodiment, the main body is entirely formed of a transparent, rigid material such as a transparent plastic.

In an embodiment, the main body formed of a transparent, rigid material or the integral light-diffusive and integral opaque regions of the main body are composed of a resin or a plastic, such as polyvinyl chloride (PVC) or acrylonitrile butadiene styrene (ABS).

When the main body is a transparent main body and the main body comprises at least one light-diffusive region and at least one region that is opaque, the light-diffusive and opaque regions may be formed by respective coatings of a light-diffusive material and an opaque material applied to either the inner surface or the outer surfaces of the main body.

Figure 3A:
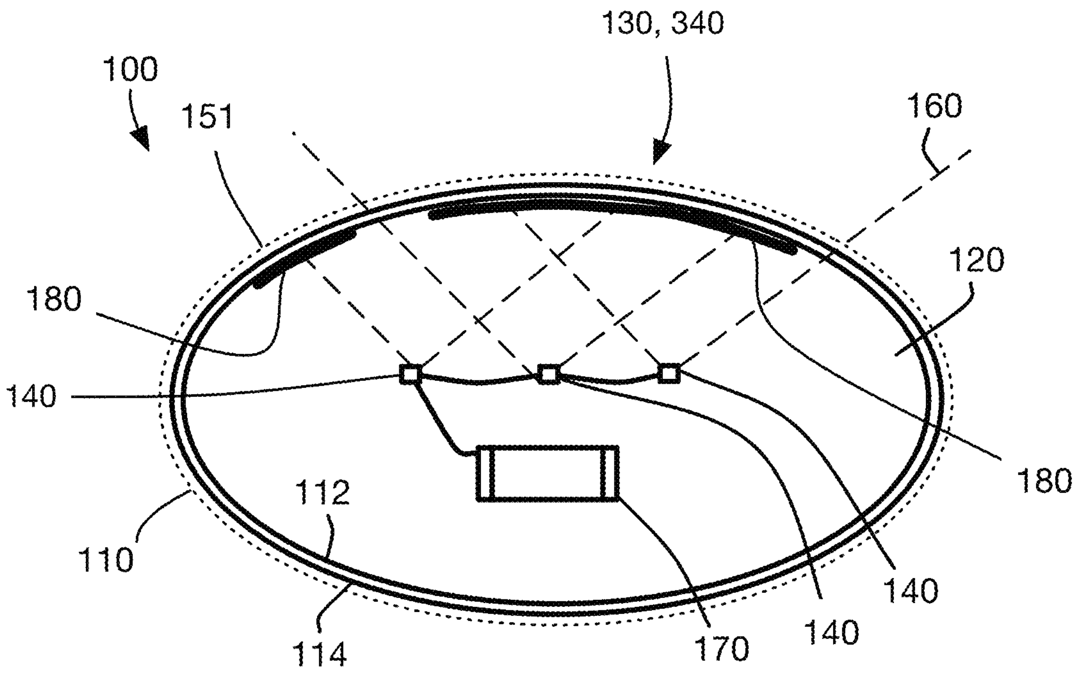
FIG. 3A shows an embodiment of the toy figurine having a transparent main body and an integral opaque covering.

In an alternative embodiment shown in FIG. 3A, the light-diffusive-region 130 for a main body 110 that is transparent can be formed using just a light-diffusive covering in the form of a light-diffusive coating 151 applied to either the inner surface (shown at 112) or the outer surface (shown at 114) of the main body 110. In the toy figurine shown in FIG. 3A, the transparent main body is fashioned therefore such that the entire main body 110 is light-diffusive and the light-diffusive region 130 is a whole-body light-diffusive region 340. In such exemplary toy figurines, the main body 110 includes no opaque regions. In the specific example provided in FIG. 3A, the whole body light-diffusive region 340 is formed from a coating 151 of light-diffusive material applied to the outer surface 114 of the transparent main body.

Figure 3B:
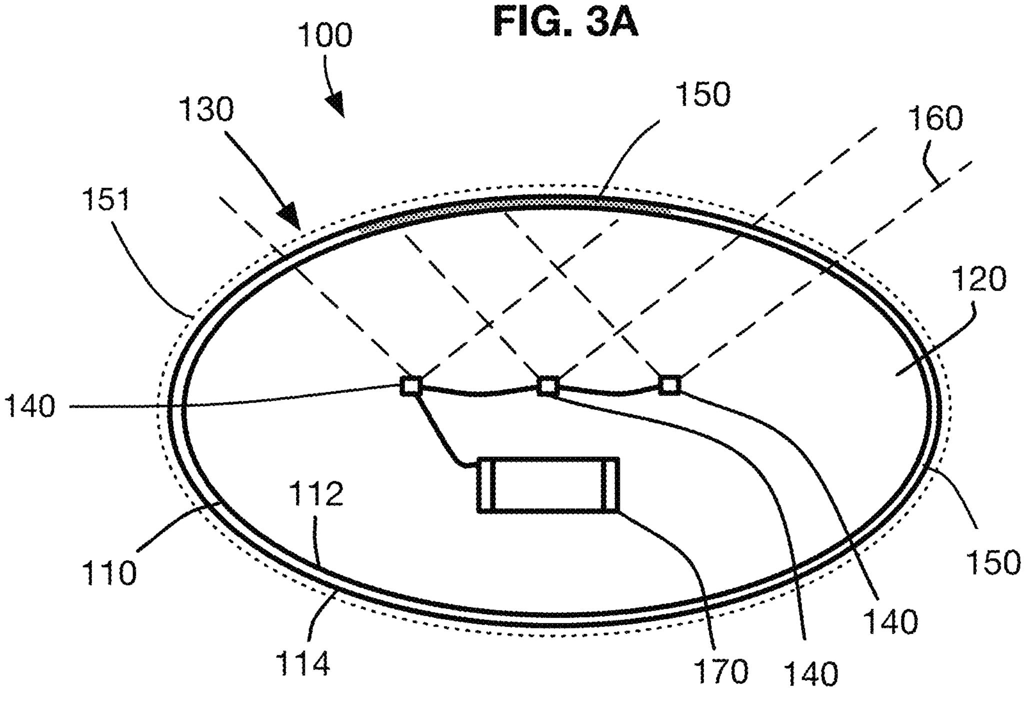
FIG. 3B shows an embodiment of the toy figurine having a transparent main body and an opaque coating on an inner surface of the main body.
Figure 3C:
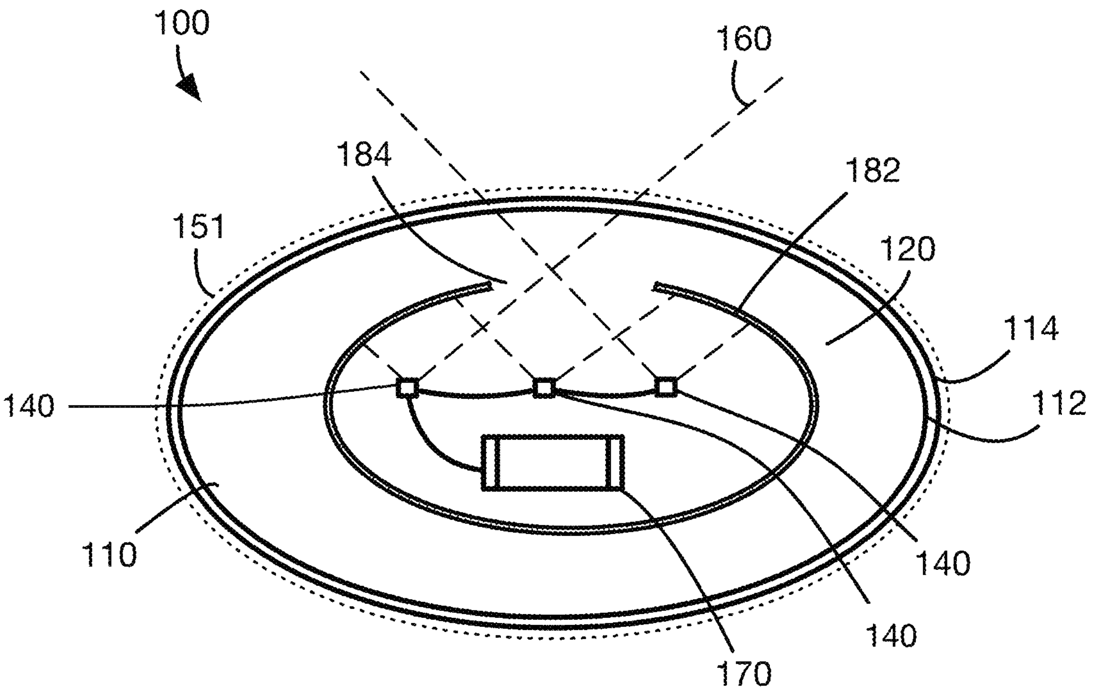
FIG. 3C shows an embodiment of the toy figurine having a generally elliptical main body and an opaque inner body.
Figure 3D:
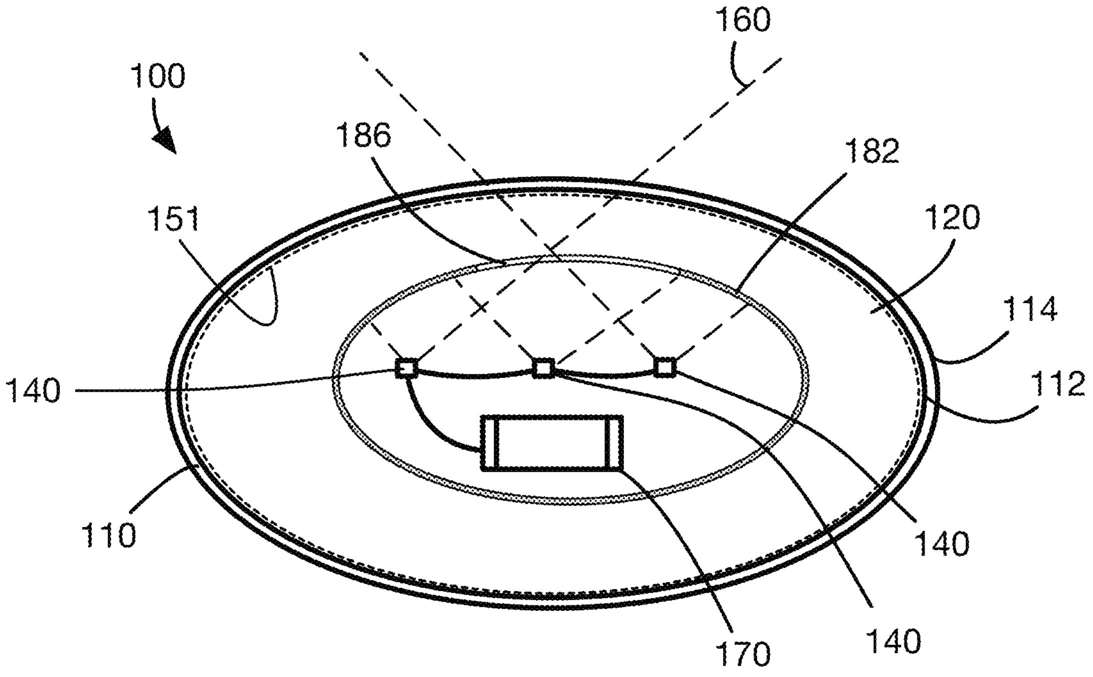
FIG. 3D shows an additional embodiment of the toy figurine having a generally elliptical main body and an opaque inner body.

Alternatively, the entire inner surface 114 of the transparent main body may be coated with the light-diffusive coating 151 of a light-diffusive material as shown in FIG. 3D.

Referring to the embodiment provided in FIG. 3B, the main body 110 in this embodiment is similar to that shown in FIG. 3A, except that the main body 110 includes regions 130 that are transparent, and at least one region 150 that is co-molded therewith, and which is opaque. For the embodiment shown in FIG. 3B, it may be said that the main body comprises at least one light-diffusive region 130 and at least one opaque region 150, wherein the at least one light-diffusive region 130 is formed of a light diffusive material, while the at least one opaque region 150 of the main body is integrally formed with the at least one light diffusive region 130.

In the embodiment shown in FIG. 3A, the coatings of both the light-diffusive material 151 and the opaque material 180 that are applied to the transparent main body 110 are both coatings of paint. The coatings of paint that makeup the opaque and light-diffusive regions of the main body 110 have colors and maximum thicknesses to either permit or prevent the pass-through and diffusion of light emitted from the plurality of light emitting elements 140.

In an embodiment, the main body 110 of the toy figurine has an outer surface that provides a visible, recognizable form to the toy figurine. In the specific examples shown in FIGS. 4A-4C and 5A-5C, the main body 110 has the form of a horse including a head, neck, torso and a plurality of legs. The form of the main-body need not be limited to a horse like configuration. The main body may have a variety of forms of known figures including fictional or real animals, humans, insects, vehicles, characters from fictional works or any other suitable form.

Figure 4A:
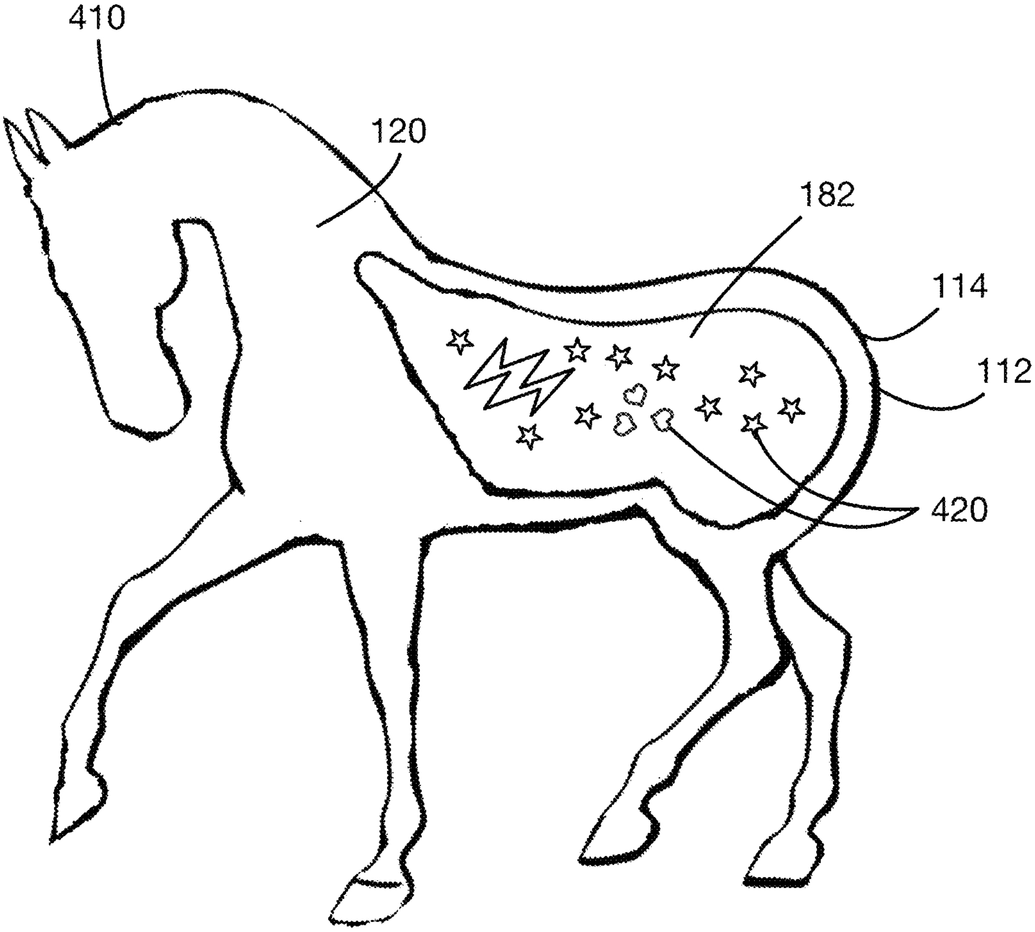
FIG. 4A shows an embodiment of the toy figurine having main body with a horse-like form.
Figure 4C:
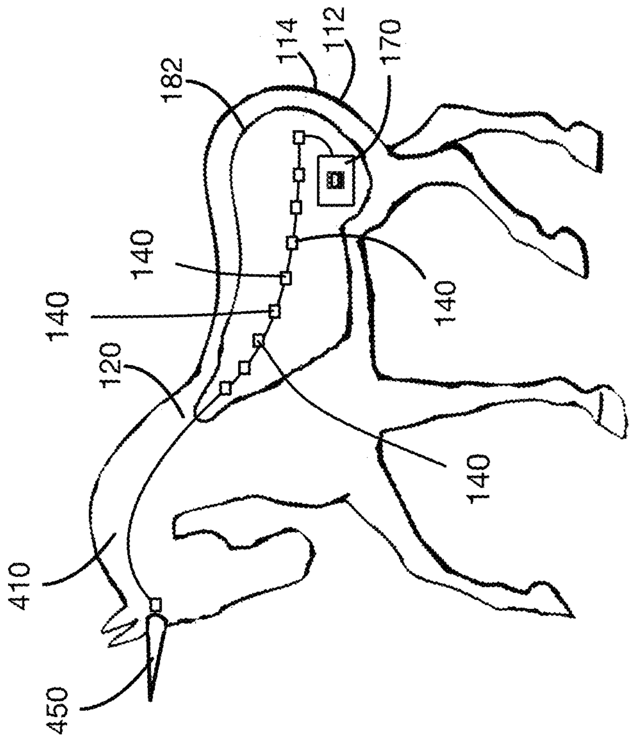
FIG. 4C shows an embodiment of the toy figurine having main body with a unicorn-like form.
Figure 4B:
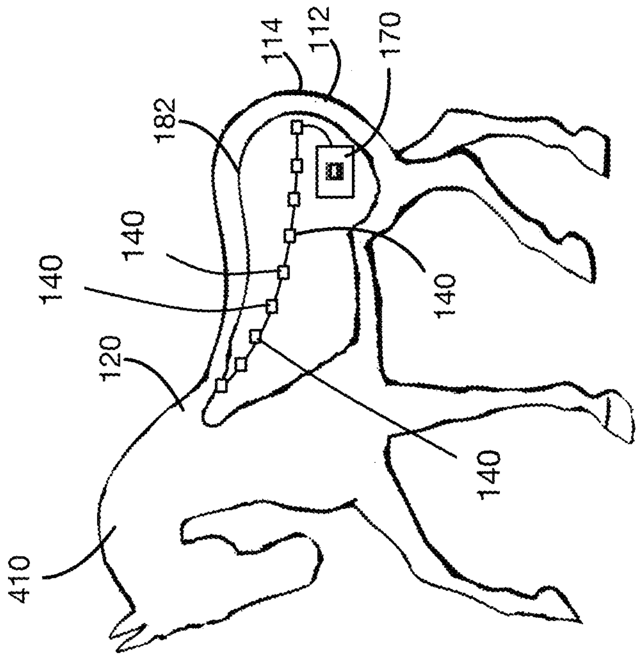
FIG. 4B shows a section view of the embodiment of the toy figurine provided in FIG. 4A.

In the embodiments provided in FIGS. 4A-4C the interior cavity 120 defined by the inner surface of the main body 110 is within the portions of the main body that define the torso, neck and head of the figurine.

The toy figurine 100 as shown in FIGS. 1A and 1B includes a plurality of light-emitting elements 140 that are disposed in the interior cavity 120 of the main body 110, and are spaced apart from one another. The light-emitting elements 140, when unilluminated, are invisible to a user outside the main body 110, and the light-emitting elements 140, when illuminated, are invisible to the user outside the main body 110 but emit light 160 that is visible to the user outside the main body 110.

In the specific examples provided in FIGS. 1A and 1B, which include a generally elliptical main body 110 with a generally elliptical interior cavity 120, the plurality of light-emitting elements 140 within the interior cavity are three light emitting elements. In this embodiment, the light emitting elements 140 are connected in series to the controller 170 and are spaced laterally apart from one another.

The opacity of the main body 110 and the light-diffusive region 130 of the main body is such that the light-emitting elements 140 are invisible from outside the main body when they are not turned on. When the light-emitting elements 140 are turned on and emit light 160, the opacity and light-transmissivity of the light-diffusive regions 130 is such that the light-emitting elements 140 remain invisible from the exterior or the main body 110, but the emitted light 160 is visible to a user outside the main body 110 through the light-diffusive region 160.

The toy figurine as disclosed herein includes at least one opaque covering 180 positioned within the outer surface 114 of the main body 110 to overlap a portion of the at least one light-diffusive region 130. The portion of the at least one light-diffusive region 130 that is not overlapped by the at least one opaque covering 180 defines a light-diffusive window 142 through which light from the plurality of light-emitting elements 140 is visible to a user outside the main body 110. In the embodiment shown in FIGS. 1A and 1B, a plurality of light-diffusive windows 142 are defined by the portion of the at least one light-diffusive region 130 that is not overlapped by the at least one opaque covering 180.

In an embodiment of the at least one opaque covering 180 positioned within the main body 110 to overlap a portion of the at least one light-diffusive region 130, the at least one opaque covering 180 is formed to have an opacity, but to not be fully opaque such that no light from the plurality of light emitting elements 140 can partially diffuse through the opaque covering 180.

In a further embodiment the opaque covering 180, the opacity that is less transmissive of light from the plurality of light emitting elements 140 than the opacity of the light-diffusive region 130 of the main body 110.

In an embodiment, the opaque covering 180 is a layer of an opaque material that is integrally formed on selected regions of the inner surface 112 of the main body 110. Referring to the specific embodiments provided in FIGS. 1A and 1B, the inner surface 112 of the main body 110 includes an opaque covering of an opaque material that is integrally formed along a section of the inner surface 112. The opaque covering 180 is positioned within the main body to overlap a portion of the at least one light-diffusive region 130. The overlapping portion of the opaque covering 180 creates a subspace of the light-diffusive region 130 through which some of the light 160 from the three light-emitting elements 140 cannot pass to the exterior of the main body 110.

In an alternative embodiment shown in FIG. 1B, the opaque covering 180 is an opaque coating applied to selected sections of the inner surface of the main body.

In a further embodiment, the opaque covering 180 has the form of an inner body 182 disposed within the interior cavity 122. The inner body 182 is opaque in selected regions. As shown in the specific embodiments of FIGS. 3C and 3D, the opaque covering 180 in the form of an inner body 182 is disposed between the main body 110 and at least some of the plurality of light emitting elements 140 so as to overlap the light-diffusive region 130 of the main body 110 and define the light-diffusive window 142. The inner body 182 includes at least one non-opaque region through which light 160 from the plurality of light-emitting elements 140 passes. As shown in FIG. 3C, the at least one non-opaque region may be at least one aperture 184. Alternatively, the at least one non-opaque region may be at least one region formed of a transparent material 186 that is distinct from the opaque regions of the inner body 182. (Shown in FIG. 3D)

In an embodiment, the inner body 182 includes at least one corresponding surface, the at least one corresponding surface having a form, (including a shape, curvature and/or proportions) that matches a form of a corresponding portion of the main body 110. The inner body 182 may be positioned within the interior cavity 122 such that the at least one corresponding surface is in close proximity to corresponding portion of main body 110.

In an additional embodiment, the at least one non-opaque region of the inner body 182 is positioned on the at least one of the corresponding surface.

As described previously, the toy figurine includes a controller 170. The controller 170 functions to power and control the plurality of light-emitting elements 140. The controller 170 includes control circuitry for controlling the light-emitting elements 140 and a power source connected the control circuitry and to the light emitting elements 140. The light-emitting elements 140 are selectively activated and controlled by the controller 170 to form or create patterns of light or lighting effects.

In an embodiment, the controller 170 of the toy figurine 100, is programmed to:

a) illuminate a first one of the light-emitting elements 140 at a first element illumination rate so as to emit first element light through the light-diffusive window 142, b) illuminate a second one of the light-emitting elements 140 at a second element illumination rate so as to emit through the light-diffusive window 142, second element light which overlaps partly with the first element light, c) after step b) has begun, deilluminate the first one of the light-emitting elements at a first selected deillumination rate, so as to generate an appearance of light that travels along the light-diffusive window 142 of the main body light-diffusive region.

In an alternate embodiment, the controller is programmed to carry out step c) after step b) is completed.

Figure 2A:
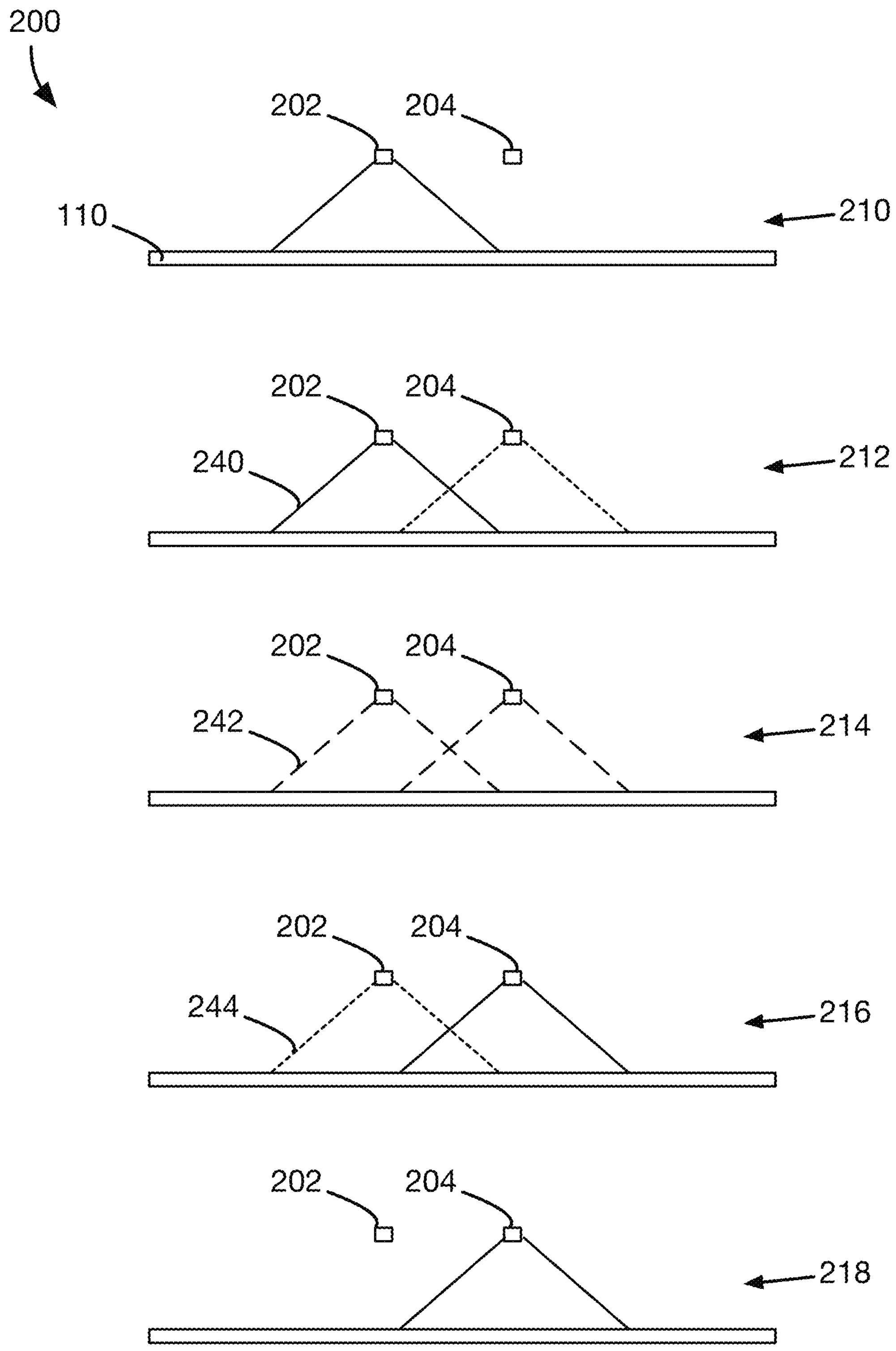
FIG. 2A shows a schematic diagram of the controlled illumination of the light-emitting elements of the toy figurine.
Figure 2B:
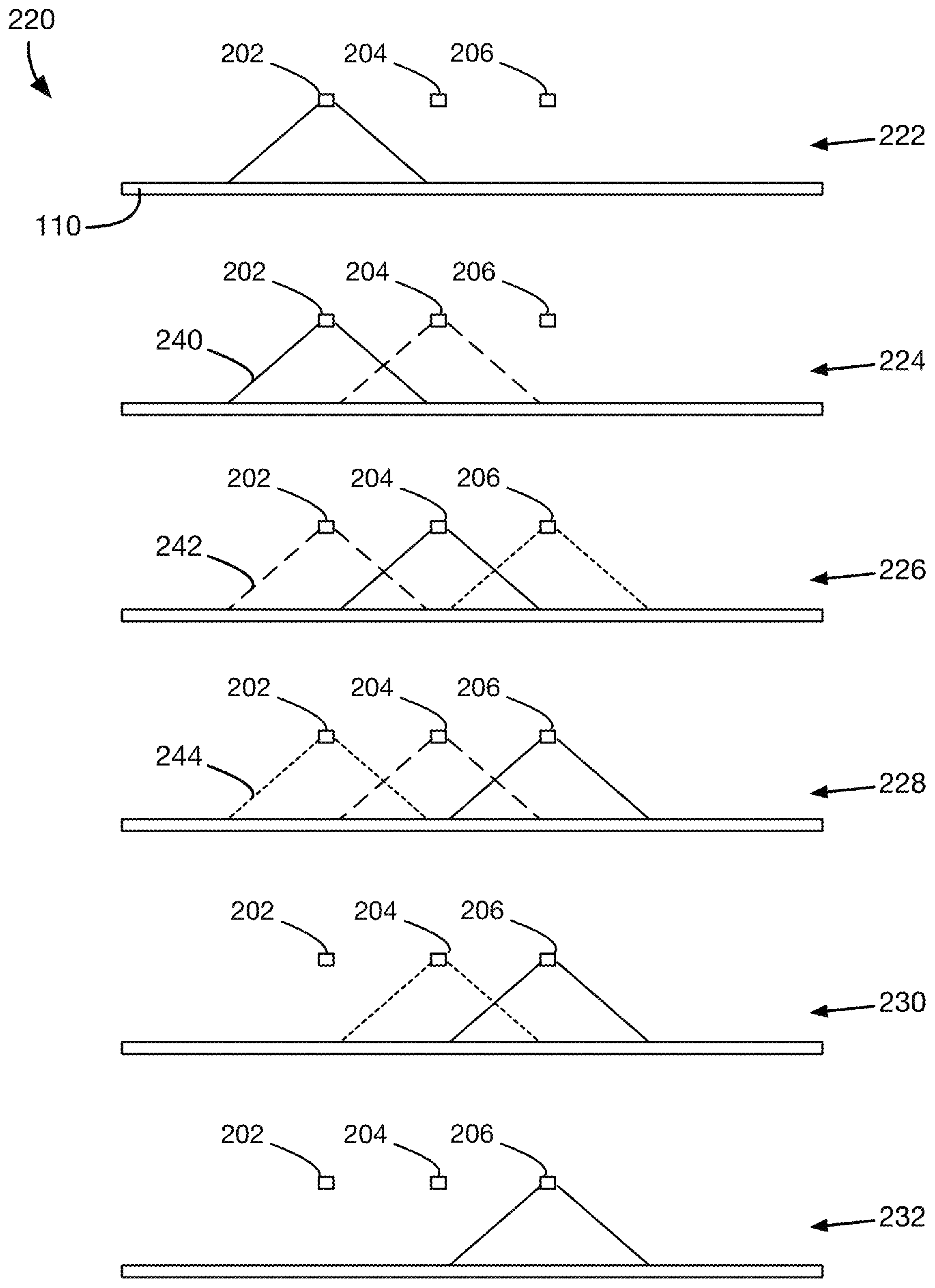
FIG. 2B shows a schematic diagram of an additional embodiment of the controlled illumination of the light-emitting elements.

Referring to the embodiment provided in FIGS. 2A, and 2B, the controller is programmed to selectively activate the plurality of light-emitting elements in the steps (a)-(c) as described above. In these embodiments, the solid lines (240) extending from the light-emitting elements represent a light-emitting element 140 being fully illuminated and producing light at a maximum intensity. The dotted lines (242, 244) extending from the light-emitting elements represent light-emitting elements 140 emitting light at varying intensities that are less than the maximum intensity, where the smaller the size of the individual dots in the dotted line, the lower the brightness of the light produced by the light-emitting elements 140.

In the diagram 200 provided in FIG. 2A, the plurality of light emitting elements are two light-emitting elements 202, 204. The instructions programmed into the controller 170 will illuminate the first one of the light-emitting elements 202 at a first element illumination rate so as to emit a first element light through the light-diffusive window 142 of the main body. As the first light-emitting element 202 is being illuminated, the second light-emitting element 204 will then be illuminated at a second element illumination rate so as to emit through the light-diffusive window 142 of the main body 110.

As shown in stages 212, 214 and 216, when both light-emitting elements are turned on, light produced from the second light-emitting element 204 will overlap partly with light produced by the first light-emitting element 206. In these stages, the first 204 and second light-emitting elements 206 are emitting light of varying intensities due to their different illuminations rates.

As shown in stages 212-218 of FIG. 2A, the controller is programmed with additional instructions where, once the second light-emitting element 204 has been illuminated, the first light-emitting element 202 is deilluminated at a selected deillumination rate until it is shut-off (stage 218). Deluminating the first light-emitting element 202 while the second light-emitting element 204 is being illuminated will produce the appearance of light travelling along the light-diffusive window 142 along the exterior of the main body 110. As shown in stages 212, 214, 216 and 218, the intensity of the light emitted by the first light-emitting element 202 decreases as the intensity of the light from the second light-emitting element 204 increases, thereby producing this appearance of moving light along the main body 110.

Referring to the embodiment provided in FIG. 2B, the plurality of light-emitting element 140 can be a first 202, second 204 and third 206 light-emitting element. The controller is programmed to selectively illuminate the first the light-emitting element 202 at a first element illumination rate so as to emit a first element light through the light-diffusive window 142 of the main body 110. As shown in stages 224, 226 and 228, while the first light-emitting element 202 is illuminated, the second light-emitting element 204 will be illuminated at a second element illumination rate so as to emit through the light-diffusive window 142 such that the second light-emitting element light overlaps partly with light produced by the first light-emitting element 202. As shown in 224, 226, 228 and 230, the controller is also programmed with instructions where, once the second light-emitting element 204 is illuminated, the first light-emitting element 202 is deilluminated at a selected deillumination rate and while the second light-emitting element 204 is illuminated, the third light-emitting element 206 will be illuminated at a third element illumination rate so as to emit. Deluminating the first and then the second light-emitting elements 202, 204 while the second and third light-emitting element 204, 206 are illuminated will further produce the appearance of light travelling along the light-diffusive window 142 along the exterior of the main body 110.

In an embodiment, the controller 170 is housed within the interior cavity 122 of the main body 110. The power source of the controller 170 may be retained within an appendage of the toy figurine that extends from the main body. The controller 170 need not be affixed within the main body, so long as it remains connected to the light-emitting elements 140.

In an embodiment, the control circuitry of the controller 17 includes a printed circuit board (PCB). The PCB may be configured with sufficient logic to direct the lighting-emitting elements 140 to create the lighting and visual effects as describe herein.

In an embodiment, the plurality of light-emitting elements 140 include a plurality of light-emitting diode (LED) bulbs connected in series. The brightness of the plurality of LEDs may be controlled through pulse-width modulation (PWM), where the PWM alters the amount of light that is emitted by the LEDs over a given period of time, thereby altering the intensity of the light as viewed through the light-diffusive window 142 of the main body 110.

The number of the plurality of light-emitting elements 140 may depend on a desired light intensity or brightness output by the light emitted from the toy figurine 100. The number of light-emitting elements 140 may alternatively depend on the number of non-opaque regions included in the opaque covering.

In an additional embodiment, the plurality of light-emitting elements 140 provide light of different colors. For example, the plurality of light-emitting elements 140 may consist of one red, one blue and one green LED, or several tri-color (RGB or red, green, blue) LEDs. In this embodiment, the controller 170 may coordinate the operation of the different color LEDs at a plurality of illumination rates to produces a multi-colored pattern that is visible on, and moves along the main body 110.

In the embodiment shown in FIGS. 4A-4C and 5A-5C, the main body 410 has the form of a horse including a head, neck, torso and a plurality of legs. The opaque covering of the toy figurine is in the form of an opaque inner body 182 with at least one non-opaque region that allows the pass-through of light from the plurality of light emitting elements 140, where the non-opaque regions of the inner body 182 are a plurality of apertures 420 having the form of designs such as a heart, star or lightning bolt.

In an embodiment shown in FIG. 4C, the toy figurine includes an externa, light-transmitting structure 450 that is at least semi-transparent and is shaped to project light therethrough. In this embodiment, the main body 410 includes a through hole into which the light-transmitting structure 450 is mounted such that an inner end of the light-transmitting structure 450 is exposed to light from the plurality of light emitting elements 140 within the interior cavity 122. The light from the interior cavity 122 is projected through the light transmitting structure 450 and is visible through the structure 450, from the exterior of the main body 410. As shown in FIG. 4C, where the figurine has a horse-like form, the light transmitting structure 450 may be formed as a horn and mounted through the main body 410 such that it projects out of the forehead of the head portion of the main body, providing the impression that the horse-like figurine is a unicorn figurine. At least one of the light-emitting elements 140 may be positioned within the interior cavity proximate the light-transmitting structure 450 to provide a greater intensity of projected light through the light-transmitting structure 450.

Figure 5A:
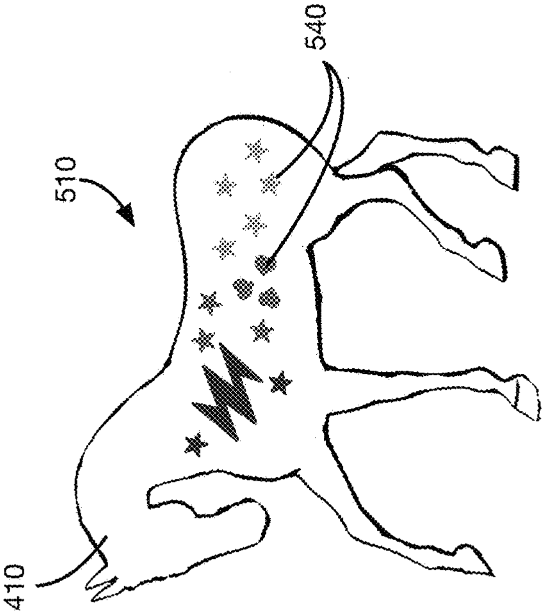
FIG. 5A shows a side elevation view diagram of a first state of a moving pattern of projected light that is visible from the exterior of a toy figurine.
Figure 5B:
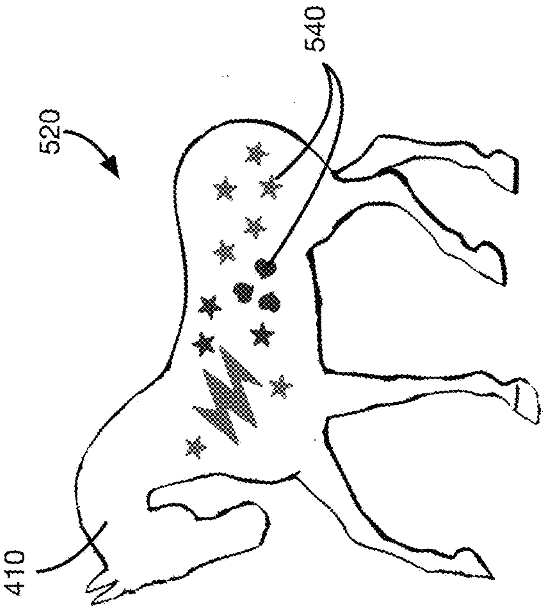
FIG. 5B shows a side elevation view diagram of a second state of the moving pattern of projected light that is visible from the exterior of the toy figurine shown in FIG. 5A.
Figure 5C:
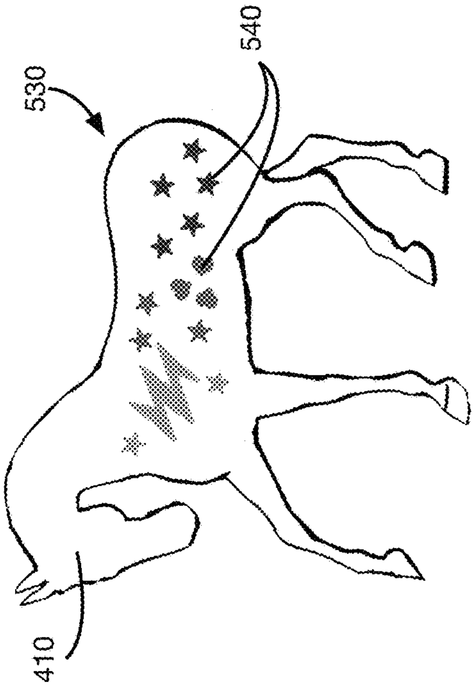
FIG. 5C shows a side elevation view diagram of a third state of the moving pattern of projected light that is visible from the exterior of the toy figurine shown in FIG. 5A.

As shown in FIGS. 5A-5C, the light emitted from the plurality of light-emitting elements 140 and passing through the light-diffusive window 142 will be visible as a at the exterior of the main body as 510 projections having a form that matches the design of the apertures (such as a heart, a star or a lightning bolt). FIGS. 5A-5C provides an exemplary embodiment of the projection 540 which are visible from the exterior of the main body. As discussed previously, the controller 170 selectively controls the illumination rates of the plurality of light-emitting elements 140 to produce the appearance of light travelling along the main body 410. Examples of the horse toy figurine are provided at three intervals (510, 520, 530) of illumination. The appearance of light travelling along the outer surface of the main body 410 is shown by the varying darkness of the projection 540 on the main body of the figurines at the first 510, second 520, and third 530 intervals of the controlled illumination of the light emitting elements. The diffusive properties of the light-diffusive window 142 through which the emitted light passes may provide the impression of a smoothly flowing pattern of projected light along the main body 410.

While it has been described to apply a coating of material to the inner surface of the main body of the toy figurine, it is alternatively possible for the coating of material to be more of the material of the main body itself so as to thicken the main body in selected regions, to reduce the light transmissibility through those selected regions sufficiently, relative to the other regions which are sufficiently thin to transmit sufficient light to be considered to act as the light-diffusive window 142.

It will be noted that, in some of the figures only some of the light-emitting elements have been identified at 140 so as not to clutter the figures. It will be understood by one skilled in the art that the other, similar-shaped elements are more of the light-emitting elements 140.

While some of the description contained herein as described the light-diffusive window as if there is a single light-diffusive window 142, it will be understood that the description can apply to each light diffusive window 142 in embodiments in which there are a plurality of light-diffusive windows 142.

In the description herein, the term 'stages' and 'states' are both used, essentially interchangeably.

The above-described embodiments are intended to be examples of the present invention and alterations and modifications may be effected thereto, by those of skill in the art, without departing from the scope of the invention that is defined solely by the claims appended hereto.

What is claimed is:

1. A toy figurine for displaying an animated light pattern, comprising:

a main body including an inner surface that defines an interior cavity and an outer surface, the main body including at least one main body light-diffusive region that is composed of a light-diffusive material;

a plurality of light-emitting elements that are in the interior cavity and are spaced apart from one another, wherein the light-emitting elements, when unilluminated are invisible to a user outside the main body, and the light-emitting elements, when illuminated, are invisible to the user outside the main body but emit light that is visible to the user outside the main body;

at least one opaque covering positioned within the main body to overlap a portion of the at least one light-diffusive region, the portion of the at least one light-diffusive region that is not overlapped by the at least one opaque covering defining a light-diffusive window through which light from the plurality of light-emitting elements is visible to a user outside the main body; and a controller that is programmed to:

a) illuminate a first one of the light-emitting elements at a first element illumination rate so as to emit first element light through the light-diffusive window, b) illuminate a second one of the light-emitting elements at a second element illumination rate so as to emit through the light-diffusive window, second element light which overlaps partly with the first element light, c) after step b) has begun, deilluminate the first one of the light-emitting elements at a first selected deillumination rate, so as to generate an appearance of light that travels along the light-diffusive window of the main body light-diffusive region.

2. The toy figurine as claimed in claim 1, wherein the at least one opaque covering is a coating of an opaque material applied to the inner surface of the main body.

3. The toy figurine as claimed in claim 1, wherein the at least one opaque covering is at least one inner body that is formed of an opaque material and is disposed within the interior cavity.

4. The toy figurine as claimed in claim 3, wherein the main body is formed from an outer body member that has an outer body member light-diffusive region.

5. The toy figurine as claimed in claim 4, wherein the outer body member is formed from a transparent material with a light-diffusive coating.

6. The toy figurine as claimed in claim 1, wherein the controller is programmed to carry out step c) after step b) is completed.

* * * * *